US011951070B2

(12) United States Patent
Zhou

(10) Patent No.: US 11,951,070 B2
(45) Date of Patent: Apr. 9, 2024

(54) MASSAGER

(71) Applicants: Dan Zhou, Shenzhen (CN); Xuejiang Zhou, Dongguan (CN)

(72) Inventor: Xuejiang Zhou, Dongguan (CN)

(73) Assignees: Dan Zhou, Shenzhen (CN); Xuejiang Zhou, Dongguan (CN)

( * ) Notice: Subject to any disclaimer, the term of this patent is extended or adjusted under 35 U.S.C. 154(b) by 0 days.

(21) Appl. No.: 17/837,072

(22) Filed: Jun. 10, 2022

(65) Prior Publication Data

US 2023/0320924 A1 Oct. 12, 2023

(30) Foreign Application Priority Data

Apr. 7, 2022 (CN) ......................... 202220800112.5

(51) Int. Cl.
*A61H 9/00* (2006.01)

(52) U.S. Cl.
CPC ... *A61H 9/0057* (2013.01); *A61H 2201/1207* (2013.01); *A61H 2201/1246* (2013.01)

(58) Field of Classification Search
CPC ........ A61H 9/00; A61H 9/005; A61H 9/0057; A61H 9/0007; A61H 9/0071; A61H 2009/0064; A61H 19/00; A61H 19/30; A61H 19/32; A61H 19/34; A61H 19/50; A61H 2201/149; A61H 21/00
See application file for complete search history.

(56) References Cited

U.S. PATENT DOCUMENTS

| | | | | |
|---|---|---|---|---|
| 3,396,720 | A * | 8/1968 | Ohkubo | A61H 9/005 604/315 |
| 3,939,830 | A * | 2/1976 | da Costa | A61M 1/67 128/206.29 |
| 4,718,411 | A * | 1/1988 | Stewart | A61F 5/41 600/38 |
| 6,200,281 | B1 * | 3/2001 | Frajdenrajch | A61H 7/008 601/84 |
| 7,118,527 | B2 * | 10/2006 | Byon | A61H 9/005 600/38 |
| 9,855,186 | B2 * | 1/2018 | Goldenberg | A61H 19/32 |
| 11,389,374 | B1 * | 7/2022 | He | A61H 9/0071 |
| 2018/0125743 | A1 * | 5/2018 | Aarestad | A61H 9/0057 |
| 2019/0015291 | A1 * | 1/2019 | Sedic | A61H 19/34 |
| 2020/0281808 | A1 * | 9/2020 | Kirsten | A61H 19/40 |
| 2020/0360222 | A1 * | 11/2020 | Haddock Dicarlo | A61H 19/44 |

(Continued)

*Primary Examiner* — Bradley H Philips
*Assistant Examiner* — Savannah L Gabriel

(57) ABSTRACT

The massager includes a rigid housing, and a driving element received in the rigid housing. The rigid housing includes a sucking part arranged on the rigid housing and defining a first sucking port, and a receiving part arranged in the rigid housing and separated from the sucking part, the receiving part defines a receiving space, a wall of the sucking part adjacent to the receiving part defines a first through hole, the first through hole is configured to communicate the first sucking port with the receiving space. The driving assembly includes a piston movably received in the receiving space, and a driving element connected with the piston, the driving element is configured to drive the piston to reciprocate in the receiving space to periodically generate a negative pressure and a positive pressure at the first sucking port. The massager of the present disclosure can provide a better adsorption effect.

17 Claims, 9 Drawing Sheets

(56) References Cited

U.S. PATENT DOCUMENTS

| | | | | |
|---|---|---|---|---|
| 2021/0128395 | A1* | 5/2021 | Witt | A61H 9/0057 |
| 2021/0161757 | A1* | 6/2021 | Murison | A61H 21/00 |
| 2021/0322202 | A1* | 10/2021 | Xu | A61F 5/41 |
| 2022/0110819 | A1* | 4/2022 | Guo | A61H 9/0057 |

* cited by examiner

MASSAGER

FIELD OF THE DISCLOSURE

The present disclosure relates to the field of massaging devices, and in particular to a massager.

BACKGROUND OF THE DISCLOSURE

With the accelerated pace of life, working pressures on people are increased. After daily working, a person may be tired, various portions of a body may ache. In order to relieve fatigue and soreness, people may take a variety of massagers to massage the body. The massager may adsorb and relax the skin to relieve the fatigue and soreness, so as to sooth the body and mind. However, the massager in the related art may have a poor adsorption effect.

Therefore, the massager in the related art needs to be improved to avoid the above defect.

SUMMARY OF THE DISCLOSURE

In view of the foregoing disadvantage inherent in the existing art, the general purpose of the present disclosure is to provide a massager, to include all advantages of the existing art, and to overcome the drawback inherent in the existing art.

An object of the present disclosure is to provide a massager. The massager includes: a rigid housing, and a driving element received in the rigid housing. The rigid housing includes a sucking part arranged on the rigid housing and defining a first sucking opening, and a receiving part arranged in the rigid housing and separated from the sucking part, the receiving part defines a receiving space, a wall of the sucking part adjacent to the receiving part defines a first through hole, the first through hole is configured to communicate the first sucking opening with the receiving space. The driving assembly includes a piston movably received in the receiving space, and a driving element connected with the piston, the driving element is configured to drive the piston to reciprocate in the receiving space to periodically generate a negative pressure and a positive pressure at the first sucking opening.

In at least one embodiment, a center line of the first through hole is spaced apart from a center line of the first sucking opening.

In at least one embodiment, an outer surface of the piston is sleeved with at least one sealing ring, and the at least one sealing ring is arranged between the outer surface of the piston and an inner wall of the receiving part.

In at least one embodiment, the driving element includes a motor, a crankshaft connected with an output shaft of the motor, a first connecting shaft, connected to an end of the crankshaft away from the motor, a second connecting shaft spaced apart from the first connecting shaft, and a connecting rod configured to connect the first connecting shaft with the second connecting shaft, the second connecting shaft is movably received in the receiving space and connected with an end of the piston close to the motor.

In at least one embodiment, the end of the piston close to the motor is protruded with at least one bracket, and the second connecting shaft is connected with the at least one bracket.

In at least one embodiment, the driving assembly further includes a sealing cover configured to cover the end of the piston close to the motor, the sealing cover defines a second through hole, and the connecting rod is movably passed through the second through hole and connected with the second connecting shaft.

In at least one embodiment, the driving assembly further includes a sealing gasket sandwiched between the sealing cover and the receiving part, the sealing gasket defines a third through hole, and the connecting rod is movably passed through the third through hole and connected with the second connecting shaft.

In at least one embodiment, the rigid housing includes a first mounting part arranged on an inner wall of the rigid housing, and the first mounting portion is configured to mount the motor.

In at least one embodiment, the driving assembly further includes a control circuit board and a battery, and the control circuit board and the battery are electrically connected with the driving element.

In at least one embodiment, the rigid housing includes a second mounting part arranged on an inner wall of the rigid housing, and the second mounting part is configured to mount the battery.

In at least one embodiment, the rigid housing includes a third mounting part arranged on an inner wall of the rigid housing, and the third mounting part is configured to mount the control circuit board.

In at least one embodiment, the rigid housing includes a first rigid housing the sucking part is arranged on the first rigid housing, and a second rigid housing communicated with the first rigid housing, the first rigid housing and the second rigid housing cooperatively define a receiving cavity, the receiving part and the driving assembly are received in the receiving cavity.

In at least one embodiment, the first rigid housing defines a fourth through hole, and the second rigid housing defines a fifth through hole, the fourth through hole is communicated with the fifth through hole after the first rigid housing is connected with the second rigid housing, the control circuit board includes a switch, and the switch is exposed from the fourth through hole and the fifth through hole.

In at least one embodiment, the massager further includes a protecting cover sleeved on the first rigid housing and the second rigid housing, and the switch is resisted against an inner wall of the protecting cover.

In at least one embodiment, the massager further includes a protecting cover sleeved on the rigid housing, the protecting cover defines a second sucking opening communicated with the first sucking opening.

In at least one embodiment, the massager further includes a rear cover, the protecting cover defines a sixth through hole at an end of the protecting cover away from the rigid housing, and the rear cover is received in the sixth through hole and detachably connected with an end of the rigid housing away from the first sucking opening.

In at least one embodiment, the protecting cover includes a flower body, a plurality of petals disposed on the flower body, and a flower heart located among the petals, the flower heart defines the second sucking opening.

In at least one embodiment, the rigid housing includes a first rigid housing the sucking part is arranged on the first rigid housing, and a second rigid housing communicated with the first rigid housing, the first rigid housing and the second rigid housing cooperatively define a receiving cavity, the receiving part and the driving assembly are received in the receiving cavity.

In at least one embodiment, the rigid housing is made of thermosetting plastic, the thermosetting plastic is at least one of phenolic resins, epoxy resins, polyurethanes, alkyd resins, urea-formaldehyde resins, melamine resins, unsaturated polyester resins, and silicone resins.

In the technical solution of the present disclosure, the driving element is configured to drive the piston to reciprocate in the receiving space to periodically generate the negative pressure and the positive pressure at the first sucking opening, to massage and stimulate the sensitive portions. The rigid housing is not prone to deform, so as to avoid the negative pressure and the positive pressure at the first sucking opening from being decreased. Therefore, the massager may generate strong negative pressure and positive pressure at the first sucking opening and provide a better adsorption effect.

BRIEF DESCRIPTION OF THE DRAWINGS

The advantages and features of the present disclosure will become better understood with reference to the following detailed description taken in conjunction with the accompanying drawing, in which.

DETAILED DESCRIPTION OF THE DISCLOSURE

Figure 1:
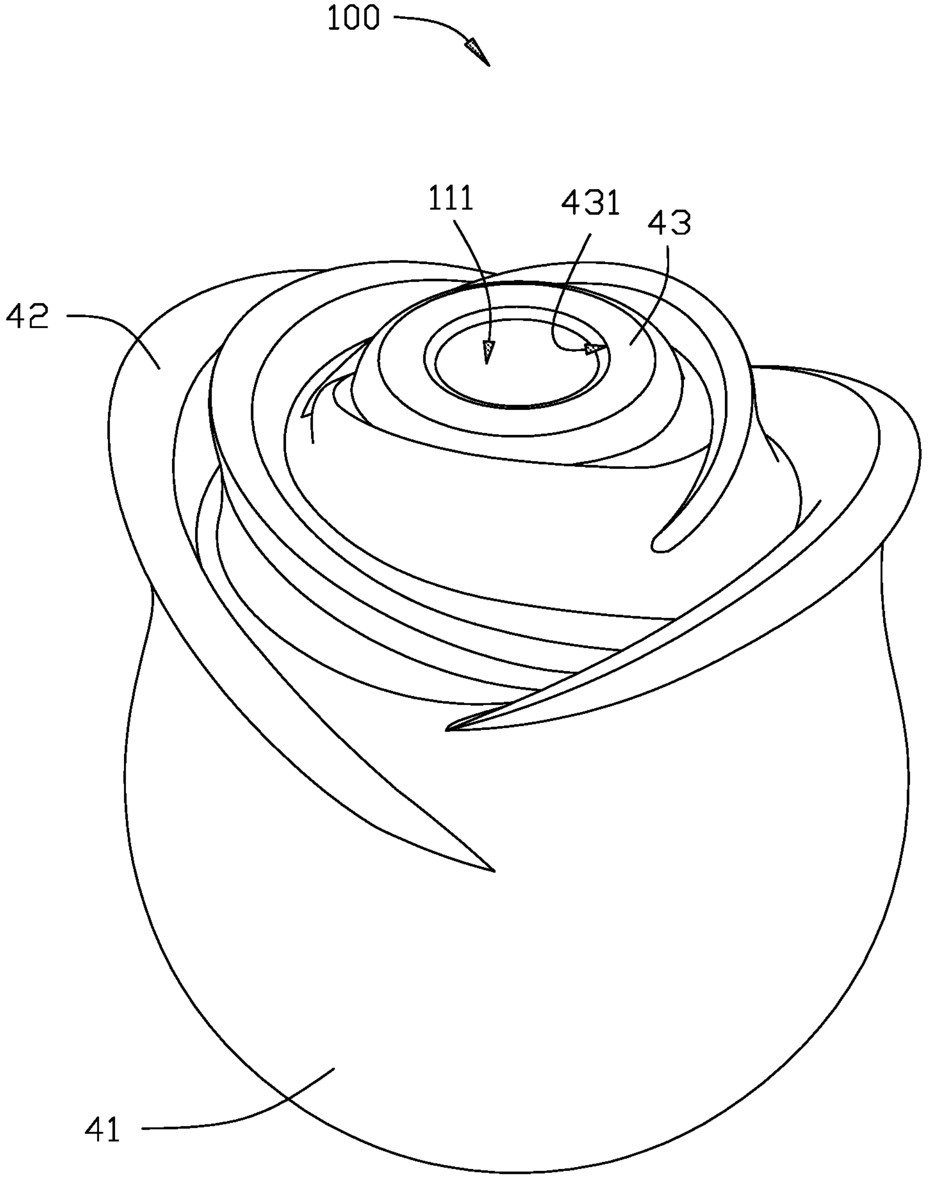
FIG. 1 is a structural schematic view of a massager according to an embodiment of the present disclosure.

The exemplary embodiments described herein detail for illustrative purposes are subject to many variations in implementation. The present disclosure provides a valve core assembly. It should be emphasized, however, that the present disclosure is not limited only to what is disclosed and extends to cover various alternation to valve core assembly. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

Referring to FIGS. 1 to 8, the present disclosure provides a massager 100 configured to massage a body of a user, especially to massage sensitive portions of the body.

The massager 100 includes a rigid housing including a first rigid housing 10 and a second rigid housing 20, and a driving assembly 30. The rigid housing includes a sucking part 11, a first side part 101, a second side part 102, and a charging end 103 opposite to the sucking part 11. The sucking part 11 is connected with the first side part 101 and the second side part 102 on opposite sides respectively, and the charging end 103 is connected with the first side part 101 and the second side part 102 on opposite sides respectively, such that the sucking part 11, the first side part 101, the second side part 102, and the charging end 103 cooperatively define a receiving space 104.

The sucking part 11 defines a first sucking opening 111, and a receiving part 12 which is arranged in the rigid housing and connected with the sucking part 11, the receiving part 12 defines a receiving space 121, a wall of the sucking part 11 adjacent to the receiving part 12 defines a first through hole 112, the first through hole 112 is configured to communicate the first sucking opening 111 with the receiving space 121.

The first sucking opening 111 defines a sucking axis X1, along which the first sucking opening 111 is symmetrical.

The driving assembly 30 is received in the rigid housing and has a piston 31 movably received in the receiving space 121 and a driving element 32 connected with the piston 31, the driving element 32 is configured to drive the piston 31 to reciprocate in the receiving space 121 to periodically generate a negative pressure and a positive pressure at the first sucking opening 111.

The piston 31 defines a reciprocation axis X2, and the rigid housing defines a symmetrical plane along a reciprocation direction. The first side part 101 is symmetrical to the second side part 102 except for any openings or ports defined in the rigid housing. The piston 31 is received in the first side part 101, and the driving element 32 is received in the second side part 102. The sucking axis X1 is parallel to and separated from the reciprocation axis X2.

In at least one embodiment, the sucking part 11 is arranged on the first rigid housing 10, and the receiving part 12 is received in the first rigid housing 10.

In at least one embodiment, the second rigid housing 20 is connected with the first rigid housing 10 to form a receiving cavity 13, the receiving cavity 13 is communicated with the first sucking opening 111. The receiving part 12 and the driving assembly 30 are received in the receiving cavity 13.

In at least one embodiment, a periphery of a wall of the first sucking opening 111 is configured to contact a skin of the user.

In at least one embodiment, the first rigid housing 10 is in a semi-elliptical shape.

In at least one embodiment, the second rigid housing 20 is in a semi-elliptical shape.

In at least one embodiment, the first rigid housing 10 and the second rigid housing 20 are made of thermosetting plastic.

In at least one embodiment, the sucking part 11 and the receiving part 12 are made of thermosetting plastic.

In at least one embodiment, the thermosetting plastic is at least one of phenolic resins, epoxy resins, polyurethanes, alkyd resins, urea-formaldehyde resins, melamine resins, unsaturated polyester resins, and silicone resins.

It can be understood that, if the first rigid housing 10 is made of a flexible material, the negative pressure and the positive pressure generated at the first sucking opening 111 may be decreased due to a deformation of the flexible housing.

In at least one embodiment, the piston 31 is a hollow cylinder.

In at least one embodiment, an end of the first rigid housing 10 close to the second rigid housing 20 is provided with a mounting block 18, and an end of the second rigid housing 20 close to the first rigid housing 10 is provided with a mounting groove 21, the mounting block 18 is detachably mounted in the mounting groove 21.

In the technical solution of the present disclosure, the driving element 32 is configured to drive the piston 31 to reciprocate in the receiving space 121 to periodically generate the negative pressure and the positive pressure at the first sucking opening 111, to massage and stimulate the sensitive portions. The rigid housing 10 is made of thermosetting plastic which is not prone to deform, so as to avoid the negative pressure and the positive pressure at the first sucking opening 111 from being decreased. Therefore, the massager 100 may generate strong negative pressure and positive pressure at the first sucking opening 111 and provide a better adsorption effect.

In detail, when the piston 31 moves towards the first sucking opening 111 in the receiving space 121, the air in the receiving space 121 is discharged to the outside through the first sucking opening 111, and the positive pressure is generated at the first sucking opening 111; when the piston 31 moves away from the first sucking opening 111 in the receiving space 121, the air near the first sucking opening 111 pours into the receiving space 121, the negative pressure is generated at the first sucking opening 111. In this way, the negative pressure and the positive pressure are generated at the first sucking opening 111 periodically, thereby simulating sucking actions.

Figure 2:
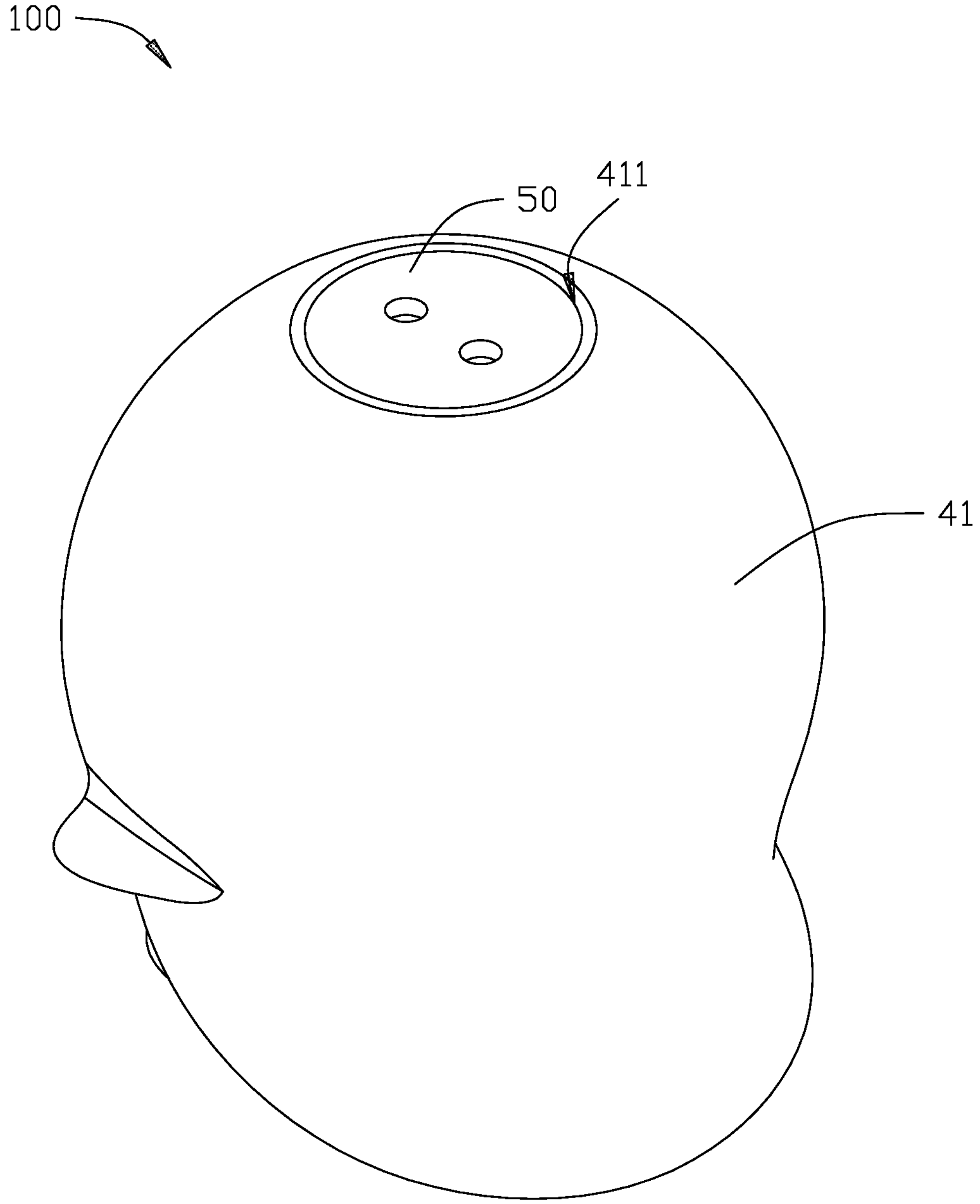
FIG. 2 is similar to FIG. 1, but shown from another view.
Figure 3:
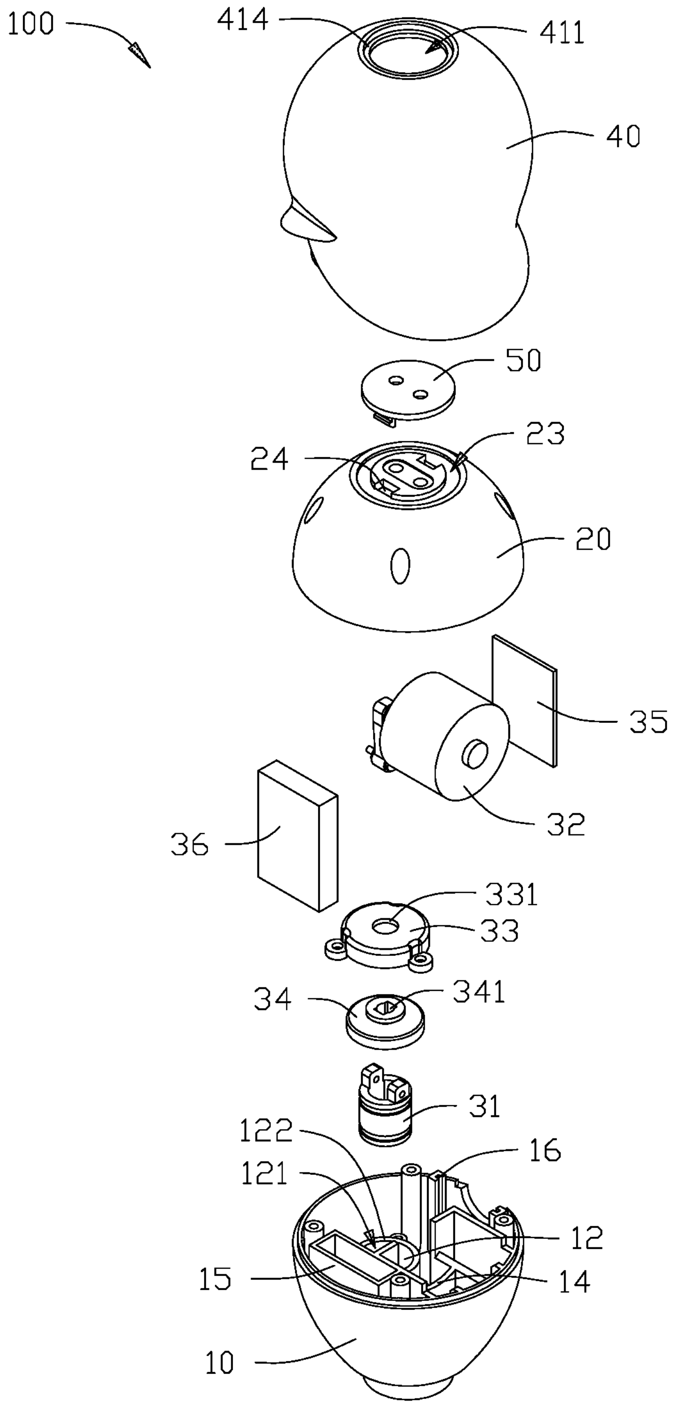
FIG. 3 is an enlarged view of the massager of FIG. 1.
Figure 4:
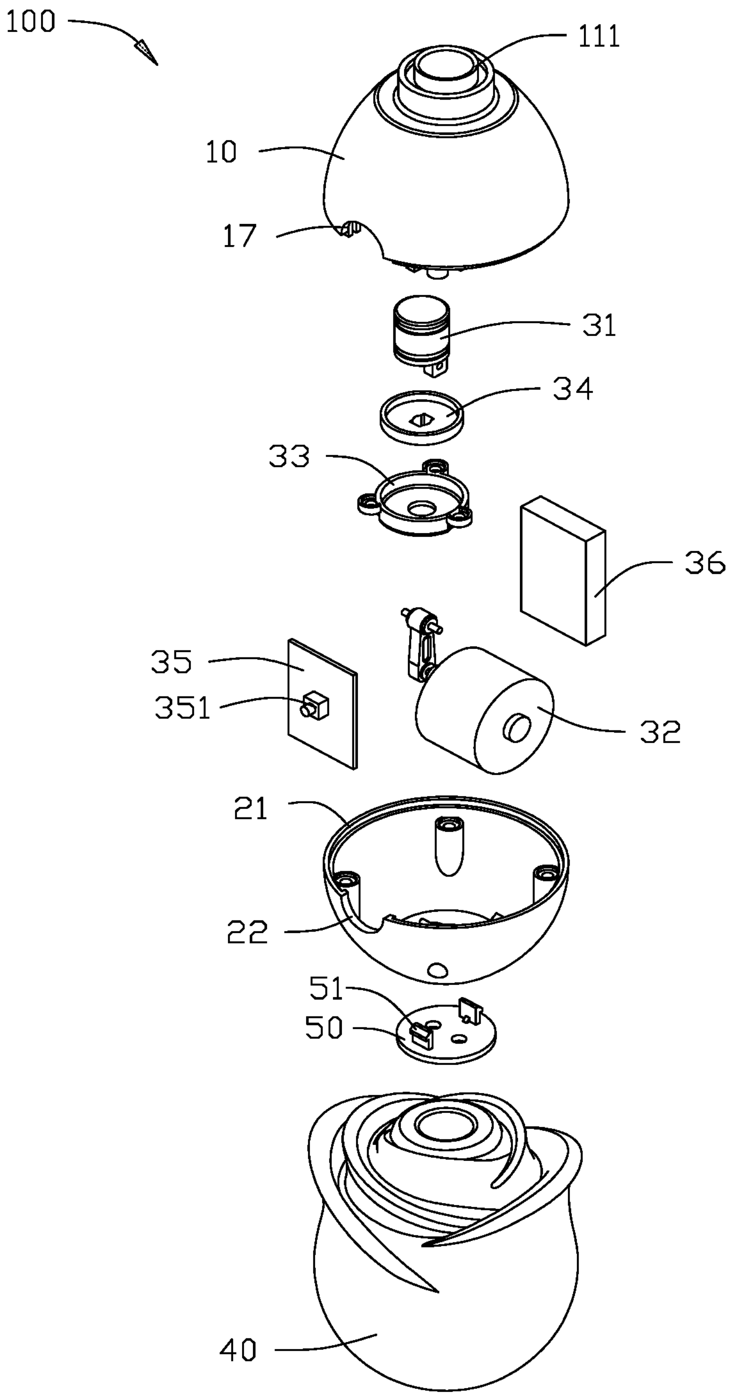
FIG. 4 is similar to FIG. 3, but shown from another view.

Referring to FIGS. 1-3, the sucking part 11 is protruded from an end of the first rigid housing 10 away from the second rigid housing 20.

In at least one embodiment, the sucking part 11 is partially received in receiving cavity 13 and communicated with the receiving space 121.

In at least one embodiment, the first through hole 112 is configured to transmit the negative pressure and the positive pressure to the first sucking opening 111.

In at least one embodiment, the end of the sucking part 11 having the first through hole 112 is received in the receiving cavity 13.

In at least one embodiment, a center line of the first through hole 112 is spaced apart from a center line of the first sucking opening 111.

In at least one embodiment, an outer surface of the piston 31 is sleeved with at least one sealing ring 311. The at least one sealing ring 311 is arranged between the outer surface of the piston 31 and an inner wall of the receiving part 12, to prevent an air leakage and increase the negative pressure and the positive pressure at the first sucking opening 111.

In at least one embodiment, the sealing ring 322 may be an O-shaped sealing ring, such as a traditional rubber sealing ring.

In at least one embodiment, the outer surface of the piston 31 defines at least one clamping groove 312, and the at least one sealing ring 311 is accommodated in the at least one clamping groove 312 to securely install the at least one sealing ring 311 between the outer surface of the piston 31 and the inner wall of the receiving part 12.

Figure 5:
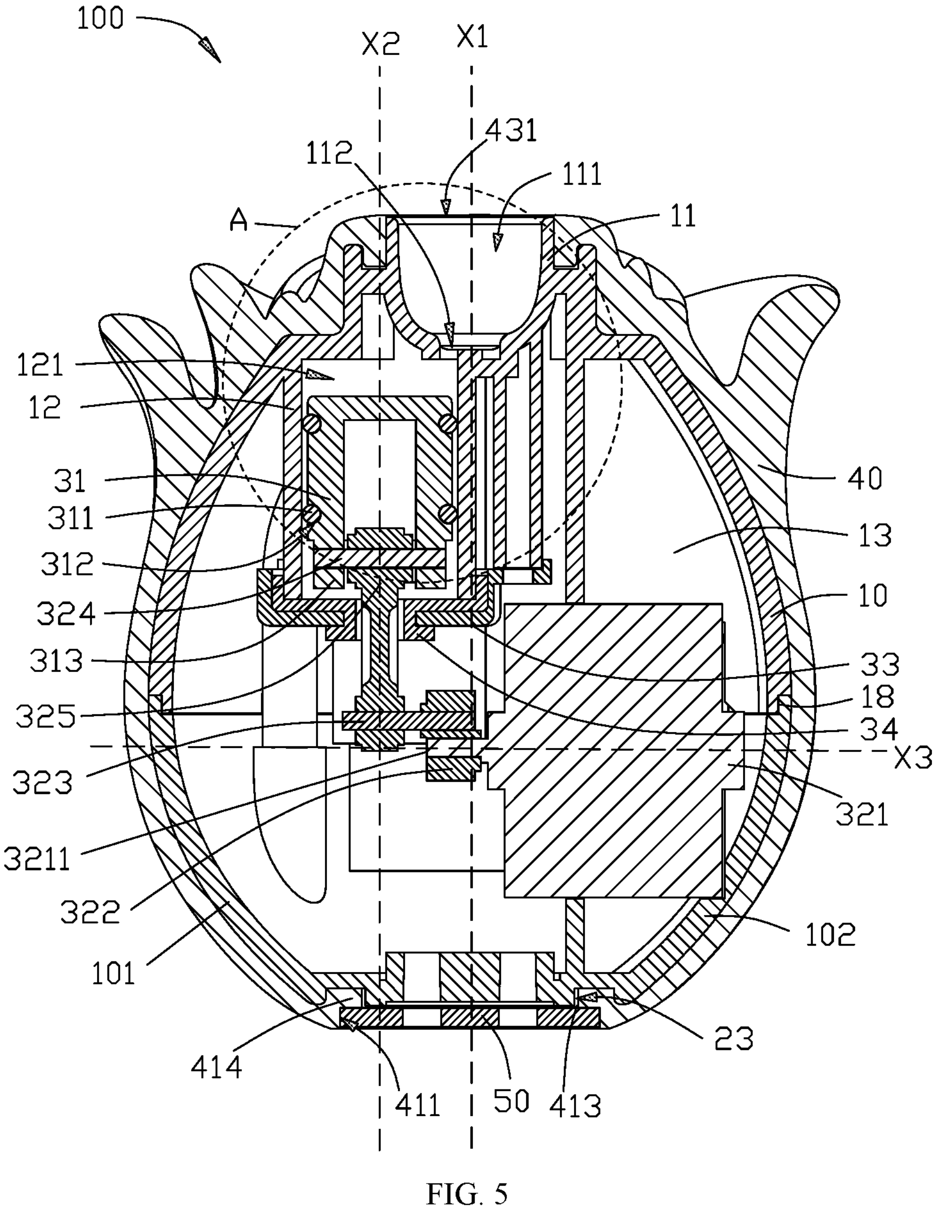
FIG. 5 is a cross-sectional view of the massager of FIG. 1.
Figure 6:
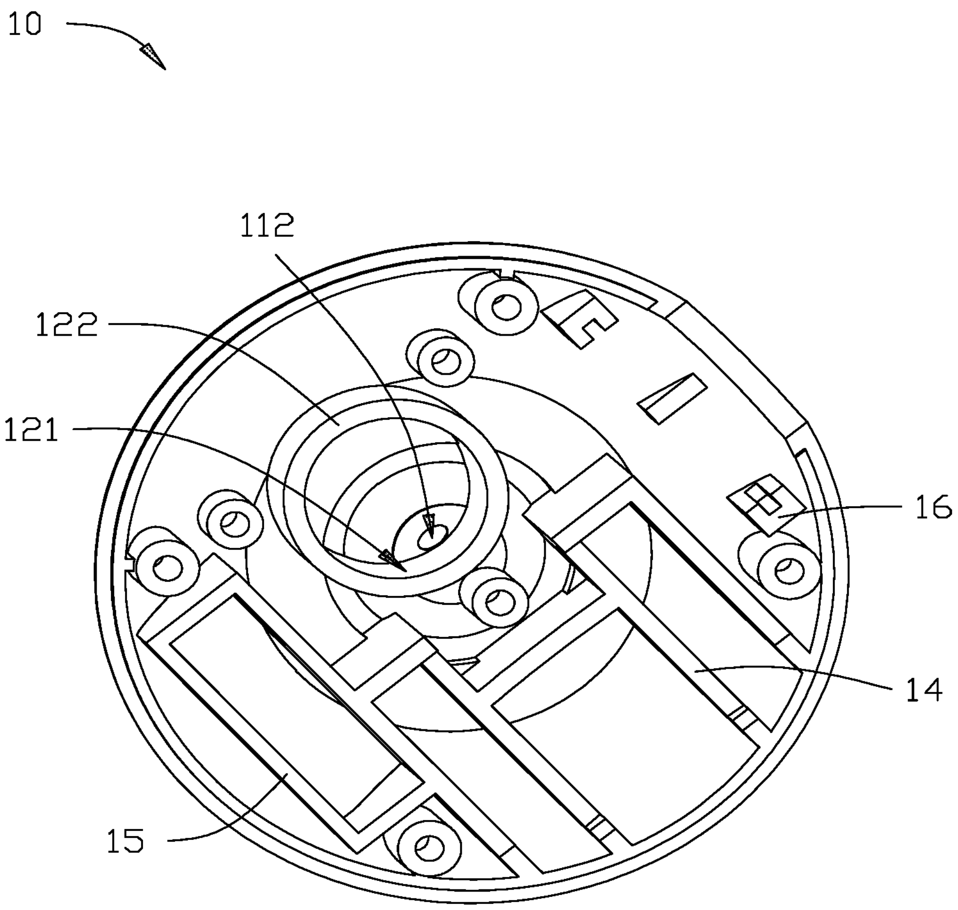
FIG. 6 is a structural schematic view of a rigid housing of the massager of FIG. 1.
Figure 7:
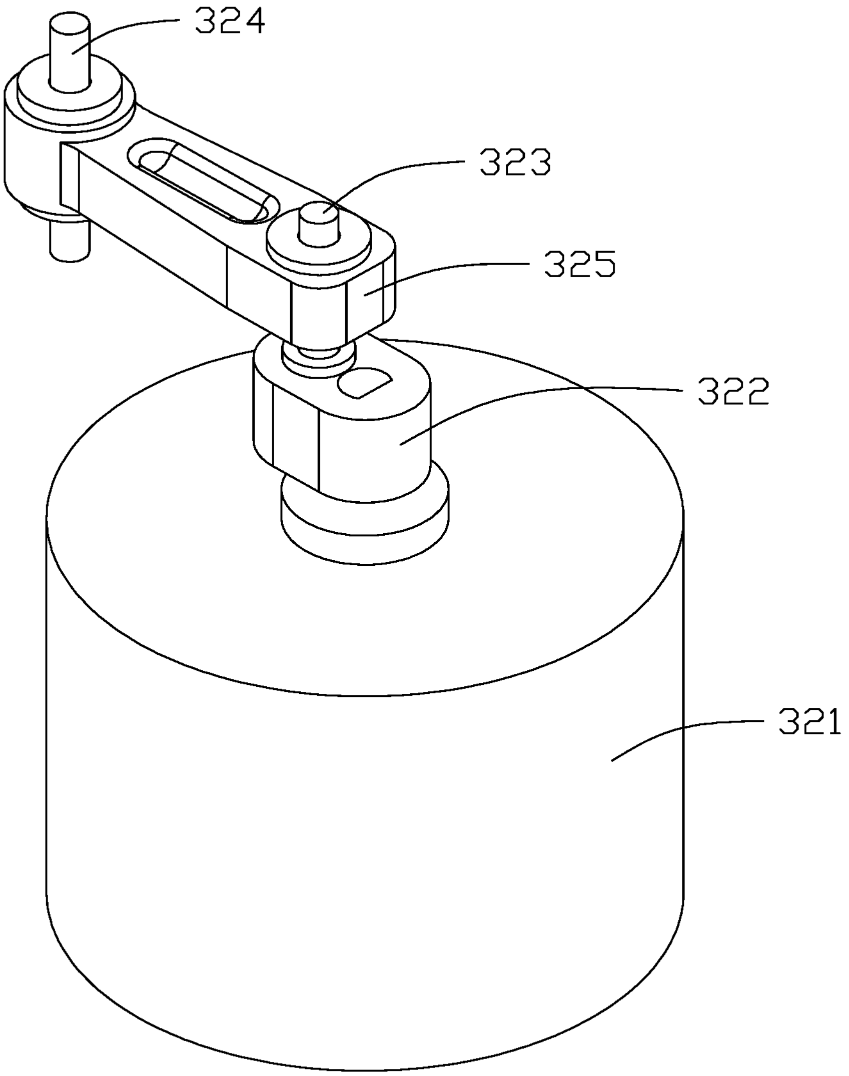
FIG. 7 is a structural schematic view of a driving element of the massager of FIG. 1.
Figure 8:
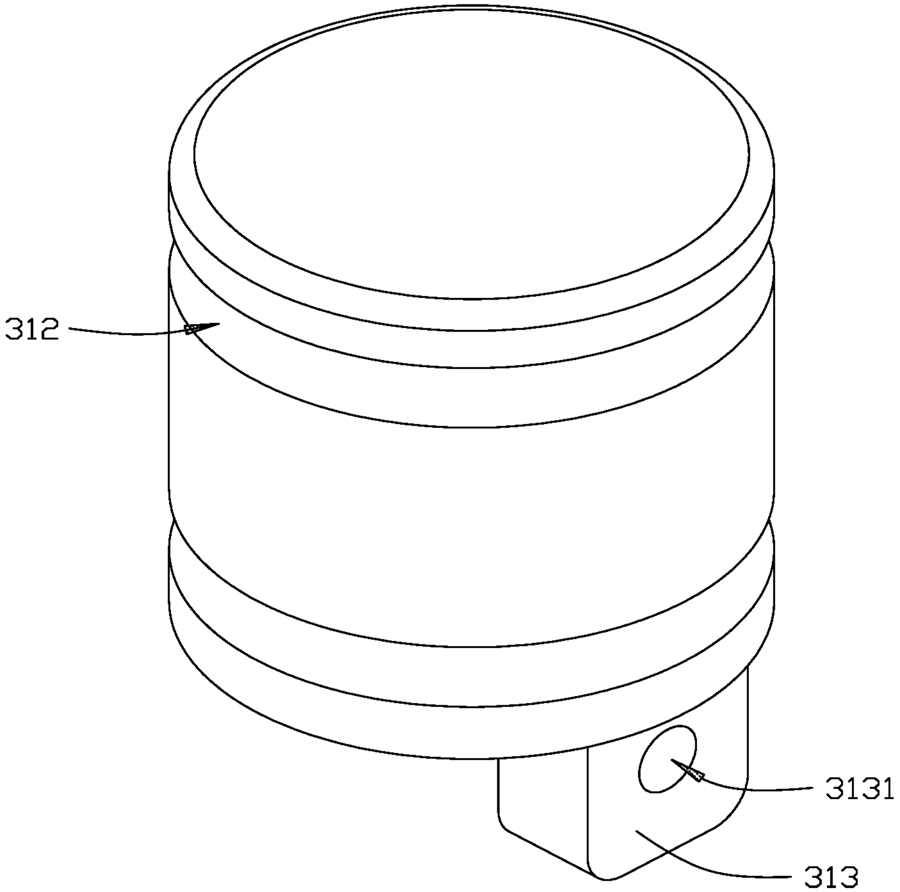
FIG. 8 is a structural schematic view of a piston of the massager of FIG. h.

Referring to FIGS. 5-7, the driving element 32 includes a motor 321, a crankshaft 322 connected with an output shaft 3211 of the motor 321, a first connecting shaft 323 connected to an end of the crankshaft 322 away from the motor 321, a second connecting shaft 324 spaced apart from the first connecting shaft 323, and a connecting rod 325 configured to connect the first connecting shaft 323 with the second connecting shaft 324. The second connecting shaft 324 is movably received in the receiving space 121 and connected with an end of the piston 31 close to the motor 321. The crankshaft 322 defines a rotation axis X3, along which the crankshaft 322 rotates. The rotation axis X3 is substantially perpendicular to the sucking axis X1, the reciprocation axis X2, and the reciprocation plane of the piston 31.

In at least one embodiment, an inner wall of the first rigid housing 10 is provided with a first mounting portion 14 configured to mount the motor 321.

When the motor 321 works, the crankshaft 322 rotates and brings the piston 31 to reciprocate in the receiving space 121 through the first connecting shaft 323, the second connecting shaft 324 and the connecting rod 325.

The end of the piston 31 close to the motor 321 is protruded with at least one bracket 313, and the second connecting shaft 324 is connected with the at least one bracket 313.

In at least one embodiment, the bracket 313 defines a mounting hole 3131, and the second connecting shaft 324 is accommodated in the mounting hole 3131.

In at least one embodiment, the piston 31 has two opposite bracket 313, each bracket 313 defines one mounting hole 3131, two ends of the second connecting shaft 324 are accommodated in the mounting holes 3131, respectively.

Referring to FIGS. 3-6, the driving assembly 30 further includes a sealing cover 33 and a sealing gasket 34. The sealing cover 33 is configured to cover the end of the piston 31 close to the motor 321. The sealing gasket 34 is sandwiched between the sealing cover 33 and the receiving part 12. The the sealing cover 33 defines a second through hole 331, the sealing gasket 34 defines a third through hole 341. The connecting rod 325 is movably passed through the second through hole 331 and the third through hole 341, and connected with the second connecting shaft 324.

In at least one embodiment, one end of the receiving part 12 away from the first sucking opening 111 has a via hole 122, and the sealing cover 33 and the sealing gasket 34 are configured to cover the via hole 122 to avoid an air leakage. The sealing cover 33 defines a receiving groove 332, the sealing gasket 34 is received in the receiving groove 332. The sealing gasket 34 covers the via hole 122 and seals a periphery of the via hole 122. The sealing gasket 34 further includes a mounting portion 342, an end of the sealing cover 33 is mounted in the mounting portion 342. The sealing cover 342 further includes a connecting portion 333, the massager further includes a connecting portion 115 extended from the sucking part 11, the connecting portion 333 is connected with the connecting portion 115 to connect the sucking part 11 with the sealing cover 33. The connecting portion 115 is substantially parallel with the sucking axis X1.

The driving assembly 30 further includes a control circuit board 35 and a battery 36, and the control circuit board 35 and the battery 36 are electrically connected with the driving element 32.

In at least one embodiment, the control circuit board 35 and the battery 36 are electrically connected with the motor 321.

In at least one embodiment, the first rigid housing 10 includes a second mounting part 15 arranged on the inner wall of the first rigid housing 10, and the second mounting part 15 is configured to mount the battery 36.

In at least one embodiment, the first rigid housing 10 includes a third mounting part 16 arranged on the inner wall of the first rigid housing 10, and the third mounting part 16 is configured to mount the control circuit board 35.

In at least one embodiment, the second mounting part 15 faces the third mounting part 16.

In at least one embodiment, the first mounting part 14 is arranged between the second mounting part 15 and the third mounting part 16.

In at least one embodiment, the first rigid housing 10 defines a fourth through hole 17, and the second rigid housing 20 defines a fifth through hole 22, the fourth through hole 17 is communicated with the fifth through hole 22 after the first rigid housing 10 is connected with the second rigid housing 20, the control circuit board 35 has a switch 351, and the switch 351 is exposed from the fourth through hole 17 and the fifth through hole 22.

Referring to FIGS. 1-5, The massager 100 further includes a protecting cover 40 sleeved on the first rigid housing 10 and the second rigid housing 20, and the switch 351 is resisted against an inner wall of the protecting cover 40. The protecting cover 40 defines a second sucking opening 431 communicated with the first sucking opening 111.

In at least one embodiment, the protecting cover 40 is in a rose shape. The protecting cover 40 has a flower body 41, a plurality of petals 42 disposed on the flower body 41, and a flower heart 43 located among the petals 42, the flower heart 43 defines the second sucking opening 431.

Figure 9:
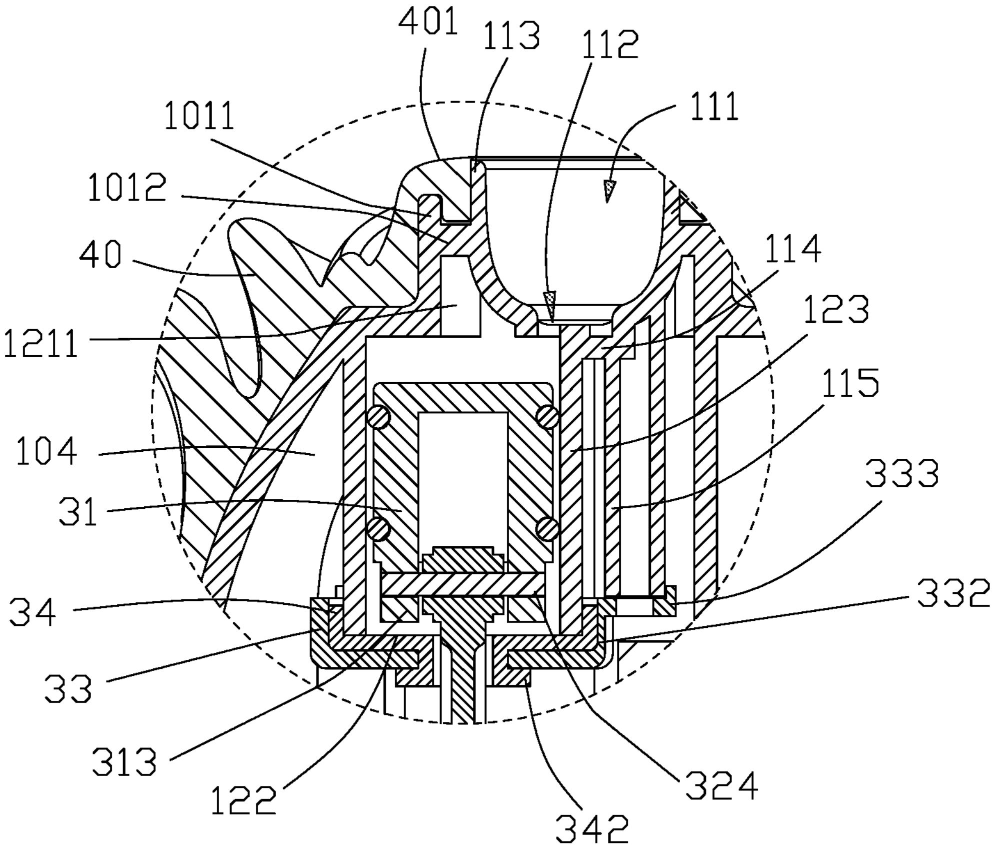
FIG. 9 is an enlarged view of portion A in FIG. 5.

As shown in FIG. 9, each of the first side part 101 and the second side part 102 includes an engaging portion 1011 and a connecting portion 1012, the connecting portion 1012 is connected between the engaging portion 1011 and a free end 113 of the sucking part 11 to connect the first rigid housing 10 with the protecting cover 40. Specifically, the engaging portion 1011 is engaged with a front end 401 of the protecting cover 40, and the front end 401 at least partially covers the free end 113. The engaging portion 1011 extends perpendicularly from a top wall of the receiving part 12, and the engaging portion 1011, the connecting portion 1012 and the sucking part 11 cooperatively define a sub space 1211 communicated with the receiving space 121 and the through hole 112. The bottom wall 114 of the sucking part 11 is connected with the side wall 123 of the receiving part 12, and the side wall 123 partially extends into the through hole 112 of the sucking part 11. In one embodiment, the sucking part 11, the receiving part 12, the first rigid housing 10 are constructed in one piece.

In at least one embodiment, the flower body 41 defines an accommodating cavity 413 communicated with the second sucking opening 431, and the first rigid housing 10 and the second rigid housing 20 are accommodated in the accommodating cavity 413.

In at least one embodiment, a periphery of a wall of the second sucking opening 431 is configured to contact the skin of the user.

In at least one embodiment, the the protecting cover 40 may be made of silicone, leather, or thermoplastic, etc., to improve the user experience.

In at least one embodiment, the switch 351 is attached to the inner wall of the flower body 41.

The massager 100 further includes a rear cover 50, the protecting cover 40 defines a sixth through hole 411 at an end of the protecting cover 40 away from the first rigid housing 10, and the rear cover 50 is received in the sixth through hole 411 and detachably connected with an end of the second rigid housing 20 away from the first rigid housing 10.

In at least one embodiment, the flower body 41 has the sixth through hole 411 at the end of the flower body 41 away from the first rigid housing 10.

In at least one embodiment, at least one engaging portion 414 is protruded from a wall of the sixth through hole 411, and at least one engaging groove 23 is defined at the end of the second rigid housing 20 away from the first rigid housing 10. The at least one engaging portion 414 is engaged in the at least one engaging groove 23, to detachably connect the second rigid housing 20 with the flower body 41.

In at least one embodiment, a bottom wall of the engaging groove 23 defines at least one clamping hole 24, the rear cover 50 further includes at least one clamping element 51, the at least one clamping element 51 is detachably clamped in the at least one clamping hole 24.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. A massager, comprising:
- a rigid housing, comprising:
  - a sucking part, defining a first sucking opening and a sucking axis;
  - a first side part;
  - a second side part, arranged symmetrically with the first side part along the sucking axis;
  - a receiving part, received in the first side part and defining a first receiving space communicated with the first sucking opening; and
- a driving assembly, comprising:
  - a piston, movably received in the first receiving space;
  - a driving element, at least partially received in the second side part and connected with the piston, the driving element is configured to drive the piston to reciprocate in the first receiving space to periodically generate a negative pressure and a positive pressure at the first sucking opening; and
- wherein the sucking part defines a first through hole configured to communicate the first sucking opening with the first receiving space; and a center line of the first through hole is parallel to and spaced apart from the sucking axis.

2. The massager of claim 1, wherein the piston defines a reciprocation axis, and the reciprocation axis is substantially parallel with the sucking axis.

3. The massager of claim 1, wherein the piston defines a reciprocation axis.

4. The massager of claim 1, wherein the rigid housing further comprises:
- a charging end, opposite to the sucking part, the sucking part, the first side part, the second side part and the charging end cooperatively define a second receiving space configured for receiving the receiving part and the driving assembly.

5. The massager of claim 1, wherein the driving assembly further comprises:
- a crankshaft, connected with an output shaft of the driving element and defining a rotation axis, and the rotation axis is substantially perpendicular to the sucking axis; and
- a connecting element, configured to connect the crankshaft with the piston.

6. The massager of claim 1, wherein the massager further comprises a protecting cover defining a second sucking opening communicated with the first sucking opening, and the protecting cover covers the rigid housing.

7. The massager of claim 6, wherein each of the first side part and the second side part further comprises an engaging portion and a connecting portion, the engaging portion is engaged with the protecting cover, and the connecting portion is connected between the sucking part and the engaging portion to connect the rigid housing with the protecting cover.

8. The massager of claim 7, wherein the engaging portion, the connecting portion and the sucking part are constructed in one piece.

9. The massager of claim 7, wherein the engaging portion, the connecting portion and the sucking part cooperatively define a sub space communicated with the receiving space.

10. The massager of claim 1, wherein the receiving part defines a hole through which the piston passes; and the massager further comprises:

a sealing cover, defining a second through hole, the sealing cover covers a sealing gasket and connects with the sucking part; and a connecting rod, connected with the piston after passing through the second through hole.

11. The massager of claim 10, wherein, the sealing gasket defines a third through hole and sandwiched between the receiving part and the sealing cover, and the connecting rod is connected with the piston after passing through the second through hole and the third through hole.

12. A massager, comprising:

a rigid housing, comprising:

a sucking part, defining a first sucking opening and a sucking axis;

a first side part;

a second side part, arranged symmetrically with the first side part along the sucking axis;

a receiving part, received in the first side part and defining a first receiving space communicated with the first sucking opening; and a driving assembly, comprising:

a piston, movably received in the first receiving space, the piston defines a reciprocation axis substantially parallel with the sucking axis; and a driving element, at least partially received in the second side part and connected with the piston, the driving element is configured to drive the piston to reciprocate in the first receiving space to periodically generate a negative pressure and a positive pressure at the first sucking opening;

wherein the sucking part defines a first through hole configured to communicate the first sucking opening with the first receiving space; and a center line of the first through hole is parallel to and spaced apart from the sucking axis.

13. The massager of claim 12, wherein the driving assembly further comprises:

a crankshaft, connected with the driving element and defining a rotation axis, and the rotation axis is substantially perpendicular to the sucking axis.

14. The massager of claim 12, wherein the rigid housing further comprises:

a charging end, opposite to the sucking part, the sucking part, the first side part, the second side part and the charging end cooperatively define a second receiving space configured for receiving the receiving part and the driving assembly.

15. A massager, comprising:

a rigid housing, comprising:

a sucking part, defining a first sucking opening and a sucking axis;

a first side part;

a second side part, arranged symmetrically with the first side part along the sucking axis;

a receiving part, received in the first side part and defining a first receiving space communicated with the first sucking opening; and a driving assembly, comprising:

a piston, movably received in the first receiving space;

a driving element, at least partially received in the second side part and connected with the piston, the driving element is configured to drive the piston to reciprocate in the first receiving space to periodically generate a negative pressure and a positive pressure at the first sucking opening; and a crankshaft, connected with the driving element and defining a rotation axis, and the rotation axis is substantially perpendicular to the sucking axis;

wherein the sucking part defines a first through hole configured to communicate the first sucking opening with the first receiving space; and a center line of the first through hole is parallel to and spaced apart from the sucking axis.

16. The massager of claim 15, wherein the piston defines a reciprocation axis.

17. The massager of claim 15, wherein the rigid housing further comprises:

a charging end, opposite to the sucking part, the sucking part, the first side part, the second side part and the charging end cooperatively define a second receiving space configured for receiving the receiving part and the driving assembly.

* * * * *